United States Patent
Baumann et al.

(10) Patent No.: US 7,198,862 B2
(45) Date of Patent: Apr. 3, 2007

(54) PROCESS FOR PREPARING A LOW-SULFUR REFORMATE GAS FOR USE IN A FUEL CELL SYSTEM

(75) Inventors: Frank Baumann, Albenau (DE); Stefan Wieland, Offenbach (DE)

(73) Assignee: Umicore AG & Co. KG, Hanau (DE)

( * ) Notice: Subject to any disclaimer, the term of this patent is extended or adjusted under 35 U.S.C. 154(b) by 270 days.

(21) Appl. No.: 10/172,570

(22) Filed: Jun. 13, 2002

(65) Prior Publication Data
US 2002/0192136 A1 Dec. 19, 2002

(30) Foreign Application Priority Data
Jun. 15, 2001 (EP) .................................. 01114506

(51) Int. Cl.
*C01B 3/26* (2006.01)
*H01M 8/04* (2006.01)

(52) U.S. Cl. ........................................ 429/17; 423/652

(58) Field of Classification Search ................ 423/650, 423/651, 652, 653, 654; 502/56; 429/17
See application file for complete search history.

(56) References Cited

U.S. PATENT DOCUMENTS

| 4,181,503 A | 1/1980 | Lesieur et al. |
| 4,436,532 A | 3/1984 | Yamaguchi et al. |
| 4,816,353 A | 3/1989 | Wertheim et al. |
| 5,693,582 A * | 12/1997 | Vuitel et al. .................. 502/41 |
| 5,932,181 A | 8/1999 | Kim et al. |
| 6,486,087 B1 * | 11/2002 | Saling et al. .................. 502/38 |
| 6,713,040 B2 * | 3/2004 | Ahmed et al. ............... 423/652 |
| 6,878,471 B1 * | 4/2005 | Burch et al. ................... 429/13 |
| 6,967,063 B2 * | 11/2005 | Krumpelt et al. ............. 429/17 |
| 7,067,453 B1 * | 6/2006 | Ming et al. .................. 502/304 |
| 2003/0042173 A1 * | 3/2003 | Krumpelt ..................... 208/134 |

FOREIGN PATENT DOCUMENTS

WO    WO 01/00524 A1 *  1/2001

OTHER PUBLICATIONS

European Patent Office Search Report, OMG AG & Co. KG, Nov. 21, 2001.

* cited by examiner

*Primary Examiner*—Wayne A. Langel
(74) *Attorney, Agent, or Firm*—Kalow & Springut LLP; John J. Santalone, Esq.

(57) ABSTRACT

The invention provides a multistep process for preparing a low-sulfur reformate gas for use in a fuel cell system. The process comprises catalytic steam reforming of a reactant gas mixture comprising sulfur-containing hydrocarbons and steam in a first step to make a reformate, reducing the carbon monoxide content of the reformate in a second step, passing the reformate over a sulfur absorber either directly after the first step or after passage through the second step, and desorbing the sulfur components optionally absorbed on the catalysts in the reforming and reducing process steps by periodically raising the temperature so as to cause the sulfer components to pass to the absorber, wherein the temperature of the absorber during operation of the process is always kept within a temperature interval which is an optimum for the absorber.

10 Claims, 1 Drawing Sheet

PROCESS FOR PREPARING A LOW-SULFUR REFORMATE GAS FOR USE IN A FUEL CELL SYSTEM

BACKGROUND OF THE INVENTION

The invention provides a multi-stage process for the preparation of a low-sulfur reformate from a mixture of hydrocarbons for use in a fuel cell system.

In general, fuel cells that produce electrical energy operate with hydrogen as the fuel. In motor vehicles, fuel cells produce the hydrogen from hydrocarbons using a hydrogen production system.

To produce hydrogen, it is known in the art that hydrocarbons can be reacted at high temperatures on a suitable catalyst in the presence of water vapor to give hydrogen, carbon monoxide and carbon dioxide. The reaction is highly endothermic and proceeds, for example, in accordance with the following chemical reaction:

$$C_8H_{18} + 8\ H_2O \rightarrow 8\ CO + 17\ H_2\ \Delta H = +1250\ kJ/mol \quad (1)$$

The steam to carbon ratio, S/C, is a characteristic of this reaction. In chemical reaction (1) S/C is 1. The conversion of a hydrocarbon-containing gas mixture into a hydrogen-rich product gas mixture is called reforming. The resulting product gas mixture is the so-called reformate or reformate gas.

It is also known in the art that another way of producing hydrogen is by catalytic partial oxidation CPO. In this case, the hydrocarbons are reacted to give carbon monoxide and hydrogen in the presence of oxygen on a catalyst, for example in accordance with chemical reaction (2). An important characteristic of partial oxidation is the air to fuel ratio λ, which is defined as the ratio of the number of moles of oxygen used to the number of moles of oxygen required for complete oxidation (see chemical equation (3)):

$$C_8H_{18} + 4\ O_2 \rightarrow 8\ CO_{(g)} + 9\ H_2\ \lambda = 0.32\ \Delta H = -685\ kJ/mol \quad (2)$$

$$C_8H_{18} + 12.5\ O_2 \rightarrow 8\ CO_2 + 9\ H_2O\ \lambda = 1\ \Delta H = -5102\ kJ/mol \quad (3)$$

A third way for obtaining hydrogen is the so-called autothermal steam reforming, in which exothermic catalytic partial oxidation is combined with endothermic steam reforming. The reaction gas mixture for autothermal steam reforming is characterized by the air/fuel ratio λ as well as by the steam/carbon ratio.

For extensive conversion of the carbon monoxide formed during reforming, one or more process steps are provided downstream of the reforming step, in which carbon monoxide is reacted with steam to give carbon dioxide and hydrogen in an exothermic shift reaction in accordance with equation (4).

$$CO + H_2O \rightleftharpoons H_2 + CO_2\ \Delta H < 0 \quad (4)$$

The residual carbon monoxide content of the reformate corresponds to the equilibrium concentration at the temperature of the outlet from the shift reactor. In order to reduce the carbon monoxide content of the reformate to less than 1 vol. %, the shift reaction is therefore often divided between two steps, a high temperature shift step and a low temperature shift step. As an alternative to the low temperature shift reaction, so-called gas separation membranes based on palladium alloys may also be used.

A process for operating a methanol reforming unit in which, during the reforming process, methanol is reformed in a methanol reforming reactor using a methanol reforming catalyst is known in the art. The problem with this process is the deactivation of methanol reforming catalysts based on Cu/ZnO at high loads. To regenerate the catalyst, the reforming process is interrupted periodically by catalyst reactivation phases. In the regeneration phases, the methanol reforming catalyst is used at a reduced load and/or a higher temperature than under normal operation or is rinsed with an inert gas.

Also, known in the art is a process for regenerating reforming catalysts in which regeneration is achieved by varying the amount of steam, air or fuel supplied during continuous operation. External heating of the reactor while keeping the reactant streams the same and also the addition of additives are described as other possibilities for regeneration.

It is desirable to use conventional engine fuels for the production of hydrogen by reforming hydrocarbons. These hydrocarbons, which are obtained from natural sources, always also contain relatively high concentrations of sulfur compounds. Diesel fuel typically contains between 100 and 1000 ppm of sulfur. The sulfur content of petrol is usually less than 100 ppm. Particularly low-sulfur petrol has a sulfur content of less than 10 ppm.

The presence of sulfur in the hydrocarbons reduces the catalytic activity of the catalysts for hydrogen production and also the activity of the anode catalysts in fuel cells.

In general, the process for preparing a hydrogen-rich reformate from hydrocarbons or mixtures of hydrocarbons is known in the art. Such a process usually consists of at least two process steps, wherein in the first step the reformate gas is obtained by catalytic steam reforming (STR) of a reaction gas mixture which contains sulfur-containing hydrocarbons and steam and is characterized by its steam/carbon ratio S/C. The carbon monoxide content of the reformate gas formed in this way is reduced in a second and subsequent steps sufficiently for the catalytic activity of the anode catalyst to be no longer substantially impaired by carbon monoxide. A carbon monoxide content of less than 100, preferably less than 50 ppm is sufficient for this purpose.

The process is particularly suitable for the reforming of hydrocarbons from natural sources, which always have a certain concentration of sulfur compounds. These sulfur compounds are reduced substantially to hydrogen sulfide due to the reductive conditions prevailing during reforming. The reformate leaving the reforming step, however, may still contain traces of organic sulfur compounds which have not been converted to hydrogen sulfide.

Some of the sulfur compounds are absorbed by the reforming and shift catalysts. The sulfur content of the reformate after leaving the catalytic steps, however, is still too high for the subsequent components.

The anode catalysts in the fuel cells are especially endangered, but any low temperature shift catalysts and gas separation membranes used to reduce the concentration of carbon monoxide are also at risk. Whereas the catalysts in the reforming steps and the high temperature shift step can be desulfurised by thermal treatment at temperatures above 600° C., which process largely regenerates the catalytic activity. This is not possible in the case of the anode catalysts, low temperature shift catalysts or any optionally used gas separation membranes. Conventional polymer electrolyte fuel cells are ruined at temperatures above about 140° C. and thus would not survive regeneration. Thus, poisoning of the anode catalysts by sulfur compounds in the reformate is irreversible.

The catalysts in the low temperature shift steps are also irreversibly poisoned by the sulfur components in the reformate gas because either they cannot be heated to the temperature required for desulfurisation, due to the way the process for the production of hydrogen is arranged, or they are not sufficiently heat resistant. Gas separation membranes, based on palladium, also frequently used to remove carbon monoxide from the reformate also have to be protected from sulfur compounds. Their permeation capacity is irreversibly damaged by sulfur compounds.

Based on the forgoing there is a need in the art for a process for preparing a low-sulfur reformate gas, the residual sulfur content of which is so low that poisoning of the anode catalysts is largely avoided. In addition, the process should enable regeneration of the reforming and shift catalysts under continuous operation.

SUMMARY OF THE INVENTION

The invention provides a multistep process for preparing a low-sulfur reformate gas for use in a fuel cell system by: catalytic steam reforming of a reactant gas mixture comprising sulfur-containing hydrocarbons and steam and having a steam/carbon ratio in a first step to make a reformate, reducing the carbon monoxide content of the reformate in a second step, passing the reformate over a sulfur absorber either directly after the first step or after passage through the second step, and desorbing the sulfur components optionally absorbed on the catalysts in the reforming and reducing process steps by periodically raising the temperature so as to cause the sulfur components to pass to the absorber, wherein the temperature of the absorber during operation of the process is always kept within a temperature interval which is an optimum for the absorber.

According to the present invention, to protect the sensitive components i.e. anode catalysts, low temperature shift catalyst, gas separation membrane, . . . etc., from harmful sulfur compounds, the sulfur species contained in the reformate gas are absorbed on a sulfur absorber which is located either directly downstream of the first process step (reforming step) or after the second process step for reducing the carbon monoxide concentration. The sulfur content of the reformate gas is sufficiently reduced for the performance of subsequent components to be no longer noticeably impaired by sulfur poisoning.

For a better understanding of the present invention together with other and further advantages and embodiments, reference is made to the following description taken in conjunction with the examples, the scope of which is set forth in the appended claims.

BRIEF DESCRIPTION OF THE FIGURES

Preferred embodiments of the invention have been chosen for purposes of illustration and description, but are not intended in any way to restrict the scope of the invention. The preferred embodiments of certain aspects of the invention are shown in the accompanying figures, wherein.

DETAILED DESCRIPTION OF THE INVENTION

Figure 1:
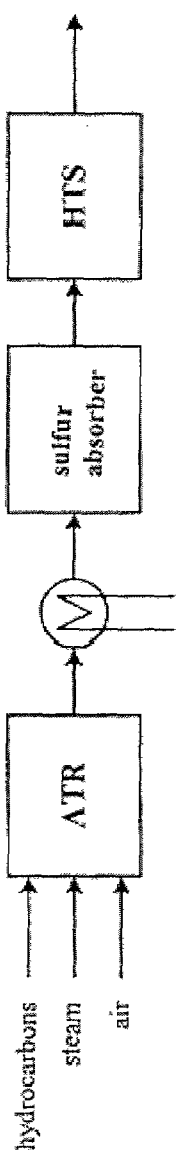
FIG. 1 illustrates a process scheme with sulfur absorber after the first process step.

The invention will now be described in connection with preferred embodiments. These embodiments are presented to aid in an understanding of the present invention and are not intended to, and should not be construed to, limit the invention in any way. All alternatives, modifications and equivalents which may become obvious to those of ordinary skill on reading the disclosure are included within the spirit and scope of the present invention.

This disclosure in not a primer on the process for preparing a low-sulfur reformate gas, basic concepts known to those skilled in the art have not been set forth in detail.

The sulfur absorber contains a suitable sulfur absorbent. Suitable absorbents for the process are ZnO, $Fe_2O_3$, $Mn_2O_3$, CuO and mixtures thereof. During the operational periods of the process, the temperature of the absorber is always maintained within a temperature interval in which the absorption capacity of the absorbent for sulfur compounds is at an optimum. The optimum temperature interval for zinc oxide is between about 350 and 400° C. Mixtures of $Fe_2O_3$ and $Mn_2O_3$ have an optimum temperature interval between 200 and 300° C.

Sulfur is present in the reformate substantially in the form of $H_2S$ due to the reducing conditions. However, the reformate may also contain traces of organic sulfur compounds not fully converted to hydrogen sulfide. To absorb these sulfur components, zeolites may be mixed with the absorbent.

These absorbents may be located in the reformate gas stream in the form of tablets or pellets or be applied to inert honeycomb structures in the form of a coating. When the absorption capacity of the absorber has been exhausted, it can be replaced by an absorber with fresh absorbent. By increasing the weight of the absorbent used, the absorption capacity of the absorber can be chosen to be large enough for replacement to take place within the scope of the normal servicing interval.

For steam reforming, catalysts are preferably used which contain at least one noble metal from the platinum group in the Periodic Table of Elements on a high surface area support material, for example platinum and/or rhodium on active aluminium oxide. This catalyst material can be applied to inert honeycomb structures in the form of a coating. Reforming catalysts such as, for example, those based on Pd/ZnO or PdZn/ZnO alloy catalyst, can also be used. However, rhodium catalysts which are stable up to temperatures of to 900 to 1000° C. under the reducing conditions prevailing during reforming are preferably used.

The process can be operated with aliphatic or aromatic hydrocarbons or mixtures of hydrocarbons and also with alcohols. Natural gas, bio-gas obtained from biological wastes, petrol, diesel oil, methanol or ethanol are particularly suitable. The steam/carbon ratio S/C is preferably adjusted to a value between 0.7 and 4, depending on the actual hydrocarbon used. The optimum temperature for performing steam reforming depends on the type of catalyst. In the case of noble metal-containing reformate catalysts, this temperature may be in the range between 400 and 900° C.

In addition, the optimum reforming temperature depends on the composition of the reaction gas mixture and on the reforming process chosen (pure steam reforming (STR) or autothermal steam reforming (ATR)). In the case of the low temperature steam reforming of natural gas, the optimum temperature is between 400 and 500° C. For methanol, the optimum reforming temperature, for both the STR and the ATR process, is between 400 and 450° C. For the reforming of petrol or diesel, the optimum temperature for STR and ATR is between 600 and 900° C.

The reformate gas can contain up to 30 vol. % of carbon monoxide. This concentration of carbon monoxide in the reformate gas is reduced to a value of about 3 vol. %, corresponding to thermal equilibrium, in a second process step, preferably on a high temperature shift catalyst (HTS) at a temperature between 350 and 550° C.

To further reduce the carbon monoxide content, the reformate can be brought into contact, in a third process step, with a low temperature shift catalyst at a temperature between 180 and 300° C. The carbon monoxide content of the reformate after leaving the third step has a value of less than 1 vol. %, in accordance with thermal equilibrium.

The sulfur absorber may be located either downstream of the first process step or downstream of the second process step. In both cases, the optimum absorber temperature is adjusted by bringing the temperature of the reformate gas to the appropriate temperature using a heat exchanger.

As previously specified, some of the sulfur compounds contained in the reformate gas remain on the reforming catalyst and optionally on the high temperature shift catalyst. This continuously reduces their catalytic activity and they have to be regenerated from time to time by removing the sulfur.

Regeneration of these catalysts takes place during continuous operation of the hydrogen production system. For this purpose, the temperature of the catalysts is periodically raised to more than 600° C. The optimum temperature for regeneration depends on the catalyst used. As a result of increasing the temperature, the sulfur compounds absorbed on the catalysts are desorbed substantially in the form of hydrogen sulfide under the reducing conditions prevailing in the hydrogen production system. During the regeneration phase, the reformate contains a considerably higher concentration of sulfur compounds than during normal operation. The downstream sulfur absorber must therefore be designed so that it is also able to remove these increased concentrations from the reformate.

Only by the use of a sulfur absorber is it now possible to regenerate the catalysts in the hydrogen production system at all without irreversibly damaging downstream components such as low temperature shift catalysts, gas separation membranes and fuel cells by flooding these with sulfur compounds. An advantage of the proposed process is that even under variable operating conditions such as, for example, in the regeneration phases, no sulfur compounds can reach the fuel cells.

The possible strategies for increasing the temperature during regeneration phases depend on the current mode of operation of the hydrogen production system. If the reforming step is operated as pure steam reforming, then the temperature can be increased, for example, by external heating of the reactor or by appropriate preheating of the reactant gas stream. Preferably, however, the temperature is increased by reducing the steam/carbon ratio while keeping the other operating conditions the same, that is while supplying the same amount of heat.

The hydrogen production system can also be operated autothermally by supplying air to the reactant gas mixture. In this case, the reactant gas mixture is also characterized by the air/fuel ratio $\lambda$, in addition to the steam/carbon ratio. Under continuous operation of the hydrogen production system, the air/fuel ratio is typically in the interval between 0 and 0.5. To regenerate the catalysts, the temperature of the reformate gas can be increased to the requisite desorption temperature for sulfur compounds by increasing the air/fuel ratio of the reactant gas mixture. Alternatively, or in addition, the steam/carbon ratio can be lowered during the regeneration phase, even in the case of pure steam reforming.

Figure 2:
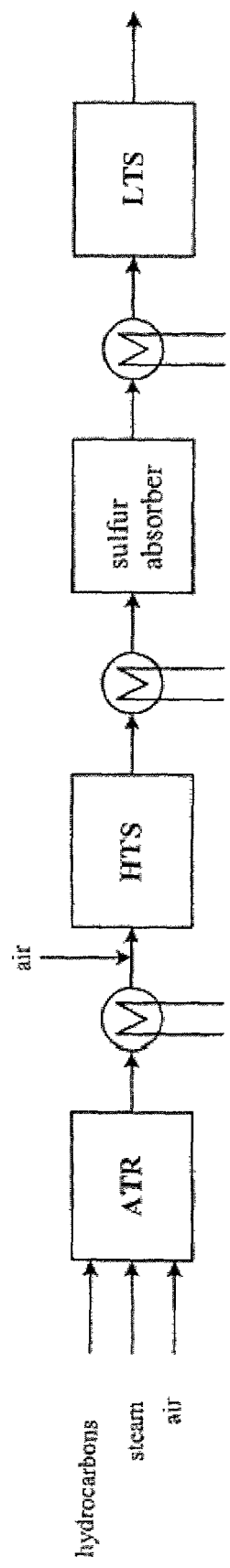
FIG. 2 illustrates a process scheme with sulfur absorber after the second process step.

FIGS. 1 and 2 are used to further explain the process according to the invention. FIG. 1 shows a process scheme with sulfur absorber after the first process step. FIG. 2 shows a process scheme with sulfur absorber after the second process step. More specifically, FIG. 1 shows a hydrogen production scheme consisting of a reforming step which is operated autothermally (ATR) and a high temperature shift step (HTS) for removing carbon monoxide from the reformate. The sulfur absorber is inserted between the ATR step and the HTS step. The air/fuel ratio of the reactant mixture and the temperature to which it is preheated are chosen in such a way that, depending on the catalyst used and the composition of the reactant gas mixture, a temperature between 400 and 900° C. is produced at the outlet of the ATR step under reforming conditions.

Downstream of the ATR step in FIG. 1 is a heat exchanger which reduces the temperature of the reformate to the optimum operating temperature of the sulfur absorber, about 400° C. The HTS step is also operated at 400° C.

The reformate contains virtually no sulfur compounds after leaving the HTS step. In the embodiment in FIG. 1, only the catalysts in the reforming step are deactivated by sulfur compounds. To regenerate these catalysts, the air/fuel ratio of the reactant gas stream consisting of hydrocarbon, water vapor and air is increased and/or the steam/carbon ratio is reduced during continuous operation. The temperature at the outlet from the ATR step is thus increased by 100 to 200° C.

FIG. 2 shows a hydrogen production scheme consisting of a reforming step which is operated autothermally (ATR), a high temperature shift step (HTS) and a low temperature shift step (LTS) for removing carbon monoxide from the reformate. The sulfur absorber is inserted between the HTS step and the LTS step. The air/fuel ratio $\lambda$ of the reactant mixture and the temperature to which it is preheated are chosen in such a way that a temperature between 400 and 900° C. is produced at the outlet from the ATR step under reforming conditions, depending on the catalyst used and the composition of the reactant gas mixture.

The operating temperature of the HTS step in this embodiment is about 550° C. and that of the LTS step is 200° C. The sulfur absorber for removing sulfur components is inserted between the HTS and the LTS steps. It is operated, as in the case of FIG. 1, at 400° C. To adjust the temperature of the refonnate gas to the requirements in the individual steps, appropriate heat exchangers are provided.

In the embodiment of the process in FIG. 2, the catalysts in the ATR step and in the HTS step are deactivated by sulfur compounds. To regenerate these catalysts, the air/fuel ratio of the reactant gas stream consisting of hydrocarbon, water vapor and air is increased and/or the steam/carbon ratio is decreased during continuous operation. The temperature at the outlet of the ATR step is thus increased by 100 to 200° C. If required, more air can be introduced upstream of the HTS step during the regeneration phase in order to achieve a desorption temperature in the HTS step of about 700° C.

While the invention has been described in connection with specific embodiments thereof, it will be understood that it is capable of further modifications and this application is intended to cover any variations, uses or adaptations if the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A multi-step process for preparing a low-sulfur reformate gas for use in a fuel cell system, said process comprising
   a) catalytic steam reforming of a reactant gas mixture, comprising sulfur-containing hydrocarbons and steam and characterized by a steam/carbon ratio, in a first step to make a reformate;
   b) reducing carbon monoxide content of the reformate in a second step;
   c) contacting the reformate with a sulfur absorber after the second step; and
   d) desorbing sulfur components, if any, absorbed on catalysts used in the first step and in the second step, by periodically raising temperature, so that the sulfur components are passed to the sulfur absorber, wherein the temperature of the absorber during operation of the process is always kept within a temperature interval in which the absorption capacity of the absorber for the sulfur components is at an optimum.

2. A process according to claim 1, wherein in the second step the carbon monoxide content of the reformate is reduced on a high temperature shift catalyst.

3. A process according to claim 2, wherein the process has an additional step in which the carbon monoxide content of the reformate is further reduced on a low temperature shift catalyst.

4. A process according to claim 3, wherein the sulfur absorber is located between the high temperature shift catalyst and the low temperature shift catalyst.

5. A process according to claim 1, wherein the increase in temperature required for desorption of the sulfur components is achieved by reducing the steam/carbon ratio of the reactant gas mixture during continuous operation.

6. A process according to claim 1, wherein the steam reforming procedure is operated autothermally by introducing air into the reactant gas mixture, wherein the air/fuel ratio is used to characterize the proportion of air in the reactant gas mixture and the temperature increase required for desorption of the absorbed sulfur components is achieved by increasing the air/fuel ratio.

7. A process according to claim 6, wherein the steam/carbon ratio is also reduced in order to increase the temperature.

8. A process according to claim 1, wherein the temperature of the absorber is kept within the temperature interval by bringing the reformate gas to a constant temperature.

9. A process according to claim 1, wherein the sulfur absorber is replaced periodically.

10. A process of operating a stationary or mobile fuel cell system in which a low-sulfur reformate gas is used, the process comprising preparing the reformate gas by the process of claim 1.

* * * * *